United States Patent [19]

Szabó et al.

[11] 4,154,806

[45] May 15, 1979

[54] PROCESS FOR THE PRODUCTION OF NITROUS OXIDE

[75] Inventors: Zoltán Szabó; Jenö Trompler; Erzsébet Hollós, née Rakosinyi, all of Budapest, Hungary

[73] Assignee: Eötvös Lóránd Tudományegyetem, Budapest, Hungary

[21] Appl. No.: 865,119

[22] Filed: Dec. 28, 1977

[30] Foreign Application Priority Data

Dec. 30, 1976 [HU] Hungary .............................. TO 1047

[51] Int. Cl.² ............................................. C01B 21/22
[52] U.S. Cl. ................................................ 423/400
[58] Field of Search .......................................... 423/400

[56] References Cited

U.S. PATENT DOCUMENTS

| 1,098,305 | 5/1914 | Torley et al. | 423/400 |
| 2,111,277 | 3/1938 | Castner et al. | 423/400 |
| 2,425,582 | 8/1947 | Vingee | 423/400 |
| 3,411,883 | 11/1968 | Smit | 423/400 X |

FOREIGN PATENT DOCUMENTS 276069  5/1913  Fed. Rep. of Germany .......... 423/400

*Primary Examiner*—G. O. Peters

[57] ABSTRACT

Ammonium nitrate is mixed, in a weight ratio of higher than 1:5, with a melt containing ammonium hydrogen sulfate and ammonium sulfate respectively present in the melt in a ratio of at least 4:1. The resultant mixture is subjected to thermal decomposition at 200–240 degrees C to produce nitrous oxide.

10 Claims, No Drawings

PROCESS FOR THE PRODUCTION OF NITROUS OXIDE

The invention concerns a process for the production of nitrous oxide ($N_2O$) which takes place by thermal decomposition of ammonium nitrate at lower temperatures with a good rate of conversion while avoiding the formation of by-products.

In medical science and in the food industry an ever-increasing amount of nitrous oxide is used and the prescribed quality requirements therefor are very high. The generally used starting material for the production of nitrous oxide is ammonium nitrate. The manufacture of this product nowadays takes place according to the classical method of heating an ammonium nitrate melt, wherein thermal decomposition ensues, and according to the reaction $$NH_4NO_3 \rightarrow N_2O + 2H_2O$$

nitrous oxide and water (vapour) are formed.

The thermal decomposition of ammonium nitrate takes place with appropriate efficiency over the melting point of the product, i.e. over 169° C., but in general at between 275°–280° C. The handling of the process and the reduction of the risk of explosion are very difficult tasks because of the high temperature and the exothermic nature of the process; hence usually the process is either a batch process or continuously operated reactors of small volumetric capacity are used in which only relatively smaller quantities of ammonium nitrate are at higher temperatures in order to avoid local overheating or to reduce the extent of any possible explosion. This safe mode of operation does not, however, allow the production capacity to be increased or provide the possibility of improving the yield; further, the requirements for increasing the speed of reaction and the purity of the end-product cannot be satisfied. On an industrial scale larger batch quantities are used and the temperature of thermal decomposition is also higher but this requires extraordinarily expensive apparatus and safety-technological and automation measures, yet account must still be taken of the danger of explosion associated with this process.

The development of an economic process which is acceptable from a safety point of view is for this reason an unsolved problem. Numerous attempts have been made to improve the production capacity, the efficiency of production and the quality of the end-product. Some methods are known which improve individual parameters of the nitrous oxide production but no single process has hitherto satisfied all the desiderata.

The thermal decomposition of ammonium nitrate is a highly complicated process the details of which have not yet been fully clarified and which takes place in various directions under the influence of certain additives. The amounts of nitrous oxide, nitric oxide, nitrogen dioxide, nitrogen, water, oxygen, ammonia, and nitric acid depend on the temperature, duration of the reaction, water content and pressure. If, for instance, transition metal oxides are added to the ammonium nitrate in a molar ratio of 1:10–100 then according to some tests the rate of thermal decomposition increases. However, it is a disadvantage of this method that the thermal decomposition is displaced in the direction of nitrogen formation, particularly in the presence of chromium oxides and manganese oxides, because at higher temperature, i.e. over 250° C., the nitrous oxide formed decomposes to higher nitrogen oxides and nitrogen. A further disadvantage of the increased temperature consists in that ammonium nitrate sublimates and thus causes material loss and operational problems. In spite of these disadvantages of increased temperatures one has not so far been able to reduce the operational temperature.

According to another known method the ammonium nitrate is mixed with smaller amounts, e.g. 0.5 weight percent of calcium oxide, depending on its chloride content, in order to be able to carry out the thermal decomposition more safely and to produce a purer product.

The decrease in the danger of explosion is achieved in the Lidow process by diluting the ammonium nitrate with an inert material. According to this method a mixture consisting of 60 weight percent of calcined sea sand and 40 weight percent of ammonium nitrate dried at 150° C. are heated in a reactor to 280° C. Because of the poor heat conductivity of the sand one cannot ensure that the optimal temperature is maintained constant and consequently the nitrogen content of the end-product increases. According to another known method a uniform heat treatment of the ammonium nitrate is achieved by the utilization of a eutectic mixture consisting of potassium nitrate and sodium nitrate, but the increased temperature of about 280° C. could not be reduced and consequently the same difficulties were present which are associated with the higher temperature.

The problems involved in the thermal decomposition of ammonium nitrate have spurred researchers to the development of other methods. According to DT-PS No. 1 921 181 nitrous oxide is produced by decomposition of ammonium nitrate in aqueous, chloride-containing nitric acid solutions, in the presence of catalysts, between about 100°–160° C. According to DT-PS No. 2 037 975 nitrous oxide is produced by oxidation of solutions of hydroxylamine containing also nitric oxide and/or oxygen in the presence of a platinum metal catalyst.

According to GB-PS No. 1 150 510 nitrous oxide is produced from a solution of nitric acid by electrolysis with the aid of acid-resistant steel cathodes.

The last-mentioned processes are in general not economical, difficult to carry out and produce relatively impure nitrous oxide; consequently a thorough purification of the product is absolutely necessary.

An aim of the invention is the development of a process starting from ammonium nitrate which process is easy to handle, can be carried out safely, involves a reduced danger of explosion and which takes place by the thermal decomposition of ammonium nitrate to produce nitrous oxide at a high rate of conversion and of high purity.

The solution of the task was made possible by carrying out the thermal decomposition under conditions fundamentally different from those known hitherto. It was shown that the theory according to which in the course of thermal decomposition of the ammonium nitrate acidification of the ammonium nitrate should be avoided is not sound. According to prevailing opinion it was considered that the acidification of the ammonium nitrate causes the formation of nitrogen-containing gases, i.e. harmful by-products and the danger of explosions associated therewith. This opinion was widely accepted for the reason that a stronger acid can set nitric acid free from the nitric salt and therefore the acidification of the ammonium nitrate melt had to be avoided during thermal decomposition. A 1:1 mixture of ammonium hydrogen sulphate and ammonium nitrate decomposes explosively and nitrous oxide results. However, the thermal decomposition of ammonium nitrate begins already at 160° C. and takes place up to 240° C. at high speed. The lowering of the temperature is in general favourable but the last-mentioned mixture is nevertheless not in practice suitable for the manufacture of nitrous oxide because the yield of the desired end-products only amounts to 80% and numerous side products, such as nitrogen, as well as nitric oxide and nitric dioxide form in a quantity higher than 5%.

It has been found that the formation of nitrous oxide in the thermal decomposition of ammonium nitrate can be influenced in a favourable direction if a portion of the acid salt component is displaced at the expense of the ammonium nitrate portion and at the same time, by the addition to the salt melt of a neutral salt of a mineral acid, a rapid abatement of the conversion is advantageously mitigated.

The characteristic feature of the process according to the invention for the manufacture of nitrous oxide consists in that the ammonium nitrate is mixed with a multi-component concentrated salt solution or salt melt in a quantity ratio of higher than 1:5 and the mixture is held between 200°–240° C., with at least one component of the salt solution or salt melt consisting of a mineral acid, an acid anhydride or an acid salt of a mineral acid. Advantageously the mineral acid, the acid anhydride or the acid salt is present in the multi-component salt solution or salt melt in a quantity ratio of at least 4:1, expediently 6–8:1, relative to the other salt components. As the acid component of the salt mixture sulphuric acid and/or ammonium hydrogen sulphate may be used and as neutral salt ammonium sulphate is preferred.

In the course of carrying out the process according to the invention the ammonium nitrate solution or the ammonium nitrate is pre-heated before adding it to the multi-component mixture. Further, it is advantageous to agitate the salt solution or salt melt during the decomposition and to utilize carbon dioxide gas in order to exclude air, especially at the beginning of the conversion and during the addition of substances. According to a further embodiment, the resulting gas mixture is brought back into contact with the acid salt melt after the thermal decomposition, i.e. the thermal decomposition can be carried out in a multi-stage manner.

In a practical mode of carrying out the conversion a reactor is used wherein isothermal conditions, stirring and exclusion of air can be ensured. Such a reactor may also be operated batch-wise but it is nevertheless more expedient to feed the ammonium nitrate continuously in accordance with the optimum reaction speed and thus also to control the reaction temperature at the same time. These conditions can also be ensured by automatic adjustment and devices and then the thermal decomposition may be carried out without difficulty.

Although the thermal decomposition takes place according to the invention with a high rate of conversion one may pass the gas generated in the reaction space through a tower which is provided with Raschig-rings or glass spheres and the surface of the fill material is covered with the above-mentioned salt solution or salt melt held at the temperature of thermal decomposition. By virtue of this repeated thermal decomposition the ammonium nitrate present in the gas phase can be transformed into the desired end-product.

The composition of the multi-component salt solution or salt melt consists of a mineral acid, preferably sulphuric acid or an acid anhydride e.g. boron trioxide, or in given cases from a mixture of the same, further decomposition may contain one or more salts, particularly ammonium salts of mineral acids. In desired cases the composition suited for the thermal decomposition may contain other salts or mineral acids, e.g. potassium and sodium salts.

A mixture of the salt solution or salt melt consisting of sulphuric acid and ammonium sulphate provides particularly favourable results. This composition is a mixture of ammonium hydrogen sulphate and ammonium sulphate. It is advantageous but not decisive that the mixture should form a homogeneous solution or melt at the given reaction temperature. The weight ratio of the ammonium hydrogen sulphate and the ammonium sulphate is preferably adjusted to at least 4:1. However, weight ratios greater than 10:1 are no longer advantageous because in such cases the conversion is displaced in the direction of formation of nitrogen and nitrogen dioxide. The weight ratio of 6–8:1 is from all points of view appropriate because then the nitrous oxide content in the gas phase amounts to 98–99 volume % and practically no nitrogen dioxide is formed. So, for instance, if one operates with a weight ratio of 10:1 relative to the ammonium hydrogen sulphate and ammonium sulphate, then the operational handling of the mixture is rendered suitably safe. Naturally, a weight ratio higher than that given above can be used in the frame of an economic carrying out of the process without disadvantages. Should the relative quantity of the salt melt increase at the expense of the ammonium nitrate then the course of the reaction improves, as do the yield and the purity of the end-product. The quality properties of the process cannot however be significantly increased above a quantity ratio of 40:1 of salt mixture and ammonium nitrate.

The dried gas product manufactured according to the invention contains 98–99% by volume of nitrous oxide and the rest consists principally of nitrogen and about 0.01 volume percent of nitric oxide. Nitrogen dioxide practically does not form at all. After removal of the water or water vapour formed in the course of the conversion a pure product is obtained the purity of which can be further improved by the usual gas purification processes until a quality corresponding to the pharmacopoeia is attained. The purified washed and dried gas is then drawn off.

The process according to the invention is illustrated by way of non-limiting Examples.

EXAMPLE 1

330 g of a salt mixture consisting of 4:1 of ammonium hydrogen sulphate and ammonium sulphate was heated in a reactor to 230° C. and a pre-heated concentrated aqueous solution of 30 g of ammonium nitrate was continuously added under constant stirring over 25 minutes to the thus formed melt. The temperature of the melt present in the reactor was 224°–232° C. Before the addition, the ammonium nitrate-containing reactor and the vessel connected therewith, as well as the associated gas ducting were flushed with carbon dioxide. After addition of the reaction components and after termination of the conversion the gas mixture formed was flushed, again with carbon dioxide, into a gas volume measurement device. The manufacture or winning of nitrous oxide was terminated after 1½ hours as the volume of the gases forming no longer changed. During the manufacture repeated gas samples were taken and these were subjected to gas-chromatographical tests. The gas mixture formed was continuously passed through a water cooler connected with the reaction space; in the water cooler the water vapour formed in the course of the conversion was condensed and separated from the gas mixture while the gas mixture was further passed through an alkali washer (filled with caustic potash) and through a drying tower. The final product contained 99.0 volume percent of nitrous oxide and approximately 1.0% nitrogen, further about 0.01% nitric oxide. The yield calculated on the gas volume amounted to 98.3% of the theoretical yield.

EXAMPLE 2

400 g of mixture consisting of 6:1 ammonium hydrogen sulphate and ammonium sulphate were heated in a reactor to 236° C. and into this salt melt 16.8 g of ammonium nitrate preheated to 170° C. was added under constant stirring and over 17 minutes at an initial rate of 1.2 g/min and a subsequent rate of 0.6 g/min. Thereafter at a uniform rate 43.2 g of ammonium nitrate was added at a rate of 0.4 g/min. The temperature of the salt melt in the reactor was continuously controlled and held between 234°-236° C. Before the addition, the reactor containing ammonium nitrate and the vessel connected therewith and which as well as the associated gas pipes were flushed with carbon dioxide gas. After the addition and termination of the conversion the gas formed was flushed with carbon dioxide into a gas volume measurement device. The generation of nitrous oxide gas and its collection were terminated 30 minutes after the last addition of the ammonium nitrate, as the volume of the gases formed no longer changed. During the evolution of gas several samples were taken for gas-chromatographical tests. The gases evolved were conveyed to a water cooler connected with the reaction space in order to condense the water vapour generated during the conversion, whereby to remove it from the reaction system. The gas free of water vapour was passed through an alkaline washing device and a drying tower. The gas recovered contained 99.2 vol. % nitrous oxide and further about 0.8% nitrogen and 0.01% nitric oxide. Calculated on the ammonium nitrate, the yield was 99.8%. In the feeding or dosing phase, where 4 g ammonium nitrate was added uniformly over 10 minutes, 1.0-1.2 Normal liter of gas resulted every 10 minutes, at a uniform rate.

EXAMPLE 3

Into a reactor equipped with a water cooler, alkaline washing device and drying tower 200 g concentrated sulphuric acid, 332 g ammonium sulphate, 6 g boron trioxide and 30 g of ammonium nitrate were charged in a mixed-together state. The system was flushed with carbon dioxide gas and heated to 240° C. and held at this temperature until the gas volume no longer changed. The result of the thermal composition was a total of 7.5 Normal liter of gas signifying a yield of 90%. The composition of the product consisted of 95.6% b.v. nitrous oxide, 4.3% b.v. nitrogen and 0.1% b.v. nitric oxide monoxide.

EXAMPLE 4

200 g sulphuric acid, 332 g ammonium sulphate, 6 g boron trioxide and 30 g of ammonium nitrate were well mixed together and charged into a reactor. The resulting gas mixture was first passed through a tower filled with Raschig-rings and containing a salt melt consisting of ammonium hydrogen sulphate and ammonium sulphate in a weight ratio of 8:1 and in a second stage through a water cooler, an alkaline washing device and a drying tower. This two-stage reactor system was flushed with carbon dioxide gas, heated to 240° C. and held at this temperature until the gas volume no longer changed. As a result of the thermal decomposition in total 8.2 Normal liter of gas were obtained, signifying a yield of 99.5%. The composition of the product was 95.2% b.v. nitrous oxide, 4.7% b.v. nitrogen and 0.1% b.v. nitric oxide.

The advantages of the invention can be summarized by stating that the conversion is carried out at lower temperatures than those according to known processes, namely at 230°-240° C., the evolution of gas is rapid and uniform, the conversion can be well controlled by the addition of ammonium nitrate, continuous operation is rendered easier and the thermal decomposition can be well controlled and handled. The possibility of explosion danger is reduced to a minimum. The conversion is approximately 100%, at the same time the degree of purity is 98-99% which signifies only a small amount of contamination and therefore the end-product can be easily purified without great losses to a product conforming to the quality prescribed by the pharmacopoeia.

What we claim is:

1. In a process for manufacture of nitrous oxide by subjecting ammonium nitrate to thermal decomposition, wherein the improvement comprises the ammonium nitrate is mixed with a melt containing ammonium hydrogen sulfate and ammonium sulfate in a respective ratio of at least 4:1; the ammonium nitrate and the melt are employed in a weight ratio of higher than 1:5; and the mixture of ammonium nitrate with the melt is subjected to thermal decomposition at a temperature of 200-240 degrees C.

2. The process, as claimed in claim 1, wherein the ammonium hydrogen sulfate and the ammonium sulfate are respectively present in the melt in a ratio of 6-8:1.

3. The process, as claimed in claim 1, wherein the ammonium hydrogen sulfate in said melt is produced in situ by reaction of sulfuric acid and ammonium sulfate.

4. The process, as claimed in claim 1, wherein during the thermal decomposition the melt is agitated.

5. The process, as claimed in claim 1, wherein ammonium nitrate is preheated before it is mixed with the melt.

6. The process, as claimed in claim 5, wherein a solution of ammonium nitrate is employed.

7. The process, as claimed in claim 1, wherein the ammonium hydrogen sulfate and the ammonium sulfate are respectively present in the melt in a weight ratio of 4:1.

8. The process, as claimed in claim 1, wherein the mixing of the ammonium nitrate with the melt and the thermal decomposition are carried out under a protective carbon dioxide atmosphere.

9. The process, as claimed in claim 1, wherein the thermal decomposition is carried out in two stages and gaseous reaction product of the thermal decomposition is contacted with the melt.

10. The process, as claimed in claim 1, wherein the melt further contains boron trioxide.

* * * * *